(12) United States Patent
Kasprzak et al.

(10) Patent No.: US 6,963,344 B1
(45) Date of Patent: Nov. 8, 2005

(54) METHOD AND SYSTEM FOR UTILIZING GRAPHICS MEMORY TO PROVIDE STORAGE FOR VIDEO BIOS INITIALIZATION

(75) Inventors: Ian L. Kasprzak, Santa Clara, CA (US); Lieven P. Leroy, South San Francisco, CA (US); Goran Devic, Austin, TX (US); Kaymann L. Woo, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 384 days.

(21) Appl. No.: 10/328,528

(22) Filed: Dec. 24, 2002

(51) Int. Cl.⁷ .............................................. G06F 12/02
(52) U.S. Cl. ..................................................... 345/543
(58) Field of Search ........................ 711/153, 154, 165; 345/530, 531, 543, 547

(56) References Cited

U.S. PATENT DOCUMENTS 6,477,642 B1 * 11/2002 Lupo ............................. 713/2
2003/0065850 A1 * 4/2003 Saw-Chu et al. ........... 710/260

* cited by examiner

*Primary Examiner*—Hiep T. Nguyen
(74) *Attorney, Agent, or Firm*—Wagner, Murabito & Hao LLP

(57) ABSTRACT

A computer implemented method for utilizing graphics memory of a computer system to provide storage for video BIOS initialization. Video BIOS memory is accessed to execute video BIOS initialization routines. A portion of graphics memory is configured for access by the video BIOS initialization routines. Program execution data from the video BIOS initialization routines is then stored in the portion of graphics memory. The program execution data is stored prior to a completion of a video BIOS power on self test.

69 Claims, 7 Drawing Sheets

400

METHOD AND SYSTEM FOR UTILIZING GRAPHICS MEMORY TO PROVIDE STORAGE FOR VIDEO BIOS INITIALIZATION

FIELD OF THE INVENTION

The field of the present invention pertains to digital electronic computer systems. More particularly, the present invention relates to a method and system for improving the boot sequence performance of a digital computer system.

BACKGROUND OF THE INVENTION

Digital computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals.

When a digital computer system is turned on from an off state, or when the computer system is reinitialized (e.g., restarted), the computer system executes a set a initialization software routines generally referred to as BIOS routines (Basic Input Output System), or BIOS. As known by those skilled in the art, the BIOS of a computer system comprises an essential set of initialization routines of the computer system, and is most typically encountered in desktop computer systems, such as personal computers or workstations. Generally, the BIOS is stored in nonvolatile memory on a chip (e.g., ROM, flash memory, or the like) and provides an interface between the operating system and the computer system's hardware. The BIOS supports all peripheral technologies and internal services such as the realtime clock (time and date), the expansion buses, the memory buses, and the like.

On startup, the BIOS tests the computer system and prepares the computer for operation by, for example, querying its own small CMOS memory bank for drive and other configuration settings. It searches for other BIOS's on the plug-in boards and sets up pointers (interrupt vectors) in memory to access those routines. It then loads the operating system and passes control to it. Generally, the BIOS accepts requests from the drivers as well as the application programs.

Additionally, on startup, the BIOS runs one or more diagnostic tests. Before it invokes the operating system, the BIOS checks to make sure all the hardware is working. It then works with the computer's hardware components in conjunction with the operating system. The diagnostic test that the BIOS performs is referred to as a POST (power on self test), and is typically performed for the keyboard, drives, ports, chips, and all other components in the system to make sure they are working correctly.

The BIOS relies upon the display of visual information via the computer system monitor in order to provide feedback to the user regarding the status and progress of the POST. The video BIOS comprises a portion of the BIOS that initializes the basic video display capability of the computer. For example, with a PC, once the basic video capability is initialized, it is often possible to see the BIOS performing this POST during the PC's startup process. A healthy system BIOS will display information about the computer, including the amount of RAM, the number of drives, and the type of processor. If the BIOS detects a hardware problem, it will halt and display a text error messages on-screen. These messages are designed to assist the user in fixing or adjusting the BIOS configuration parameters or settings. In addition to visual feedback, audible feedback can be supplied regarding the progress of the BIOS diagnostic tests. For example, one long beep can mean the BIOS successfully completed all the hardware tests, while a combination of shorter beeps can indicate a number of different errors.

There exists a problem however, with extending the capabilities of the BIOS configuration functions and the way resulting information is communicated to the user. The standard PC architecture (e.g., the x86 PC) has evolved in many ways since its introduction in the early 1980s. As hardware tests changed and as the capabilities of the "legacy architecture" have been extended, BIOS's have been periodically updated to keep pace with new emerging peripheral technologies. For example, newer BIOSs are specifically stored on a flash memory chip that can be upgraded via software to facilitate easier updating. However each of the extensions of the BIOS capability generally conform to the basic tenets of the legacy architecture.

Among the more problematic tenets of the legacy architecture is the fact that the video BIOS software is limited in size to 64 K of addressable memory. This imposes as a severe constraint on the types of operations and capabilities that can be implemented. Even more problematic is fact that some PC architectures limit the amount of RAM available to the BIOS for temporary program execution storage (e.g., stack memory) to a mere 200 bytes.

The memory limitations function as a severe constraint on the manner in which display information can be presented by the video BIOS software and the types of functions the video BIOS software can implement. These memory limitations are typically in place until the BIOS POST is complete and the operating system is initialized. Once the operating system is initialized, a video driver for the graphics subsystem of the PC is initialized to provide full function display capability. However, the memory limitations prevent any enhanced display functionality being provided early in the computer system boot process, and restrict the functionality of the POST.

Thus, what is required is a solution that overcomes the memory limitations that constrain the functionality of the BIOS software. What is required is a solution that eliminates the memory limitations of the video BIOS execution but is still compatible with the legacy PC architecture. The present invention provides a novel solution to these requirements.

SUMMARY OF THE INVENTION

Embodiments of the present invention provide a method and system for utilizing graphics memory to provide storage for video BIOS initialization. Embodiments of the present invention overcome the memory limitations that constrain the functionality of the BIOS software. Embodiments of the present invention eliminate the memory limitations of the video BIOS execution but are still compatible with the legacy PC architecture.

In one embodiment, the present invention is implemented as a computer implemented method for utilizing graphics memory of a computer system to provide storage for video BIOS initialization. Video BIOS memory (e.g., the nonvolatile memory storing the video BIOS software) is accessed to execute video BIOS initialization routines. A portion of graphic memory (e.g., graphics RAM) is configured for access by the video BIOS initialization routines. Program execution data (e.g., stack storage, variables, and the like)

from the video BIOS initialization routines is then stored in the portion of graphics memory. The program execution data is stored prior to a completion of a video BIOS power on self-test.

In another embodiment, a portion of the graphics memory is configured to provide storage for the video BIOS and that storage is configured to be preserved through the operating system boot. This embodiment includes the step of preserving at least part of the portion of the graphics memory storing program execution data during a completion of an operating system boot process such that at least part of the program execution data is available subsequent to the boot process.

In this manner, the embodiments of the present invention use the large amount of graphics memory as execution space for the video BIOS initialization routines to overcome the memory limitations associated with the legacy PC architecture. Since the legacy PC architecture does not expect to use or access any portion of the graphics memory during the legacy PC architecture boot sequence, the configuration of the graphics memory for such access is compatible with the legacy PC architecture, and thus, compatible with the legacy boot sequence. In so doing, the embodiments of the present invention can provide a very enhanced degree of video functionality early in a PC's boot sequence, prior to the initialization of an operating system or a graphics driver.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
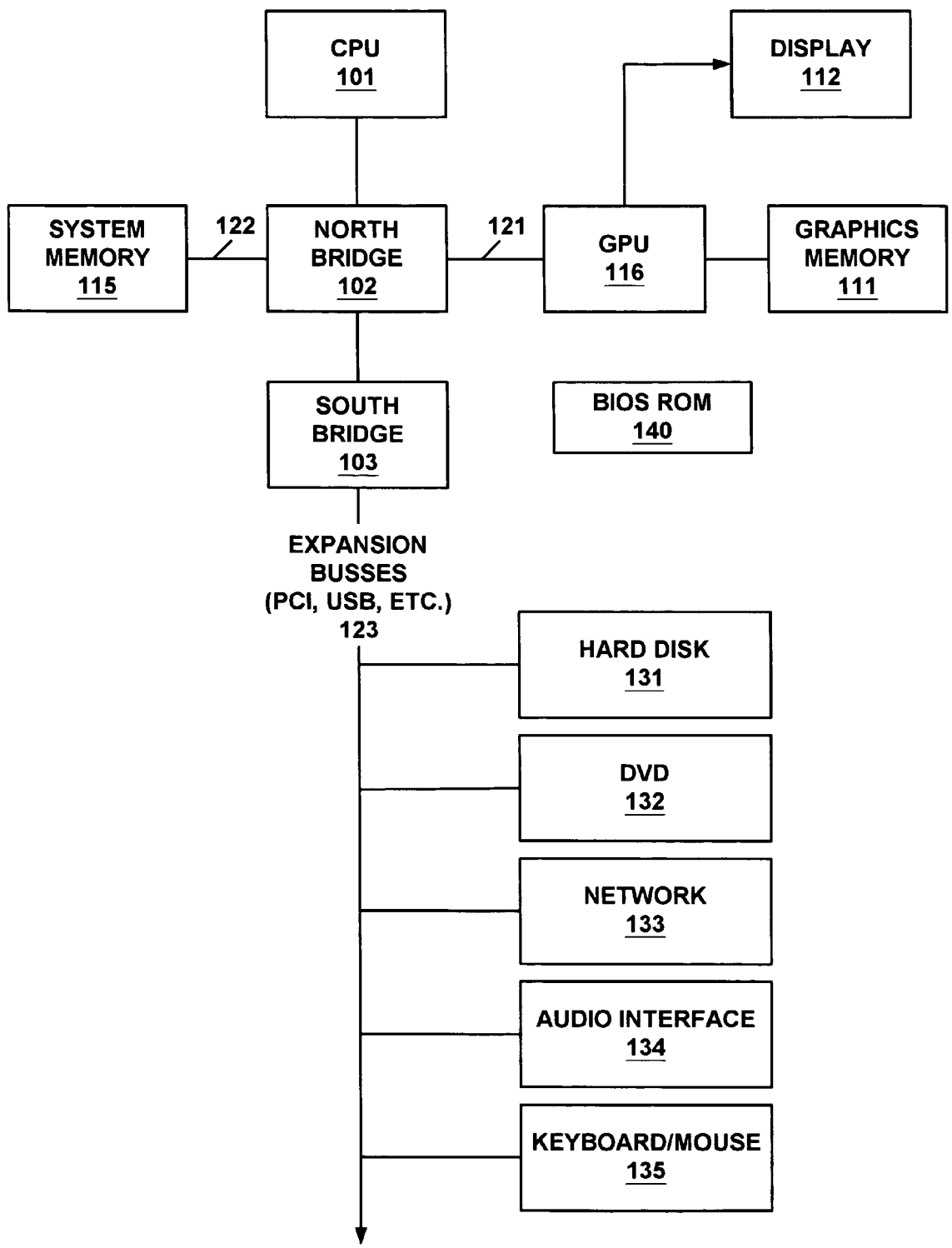
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for utilizing graphics memory to provide storage for video BIOS initialization. Embodiments of the present invention overcome the memory limitations that constrain the functionality of the BIOS software. Embodiments of the present invention eliminate the memory limitations of the video BIOS execution but are still compatible with the legacy PC architecture. Embodiments of the present invention and their benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "communicating" or "executing" or "displaying" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

With reference now to FIG. 1, a computer system 100 in accordance with one embodiment of the present invention is shown. Computer system 100 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a North bridge 102 and a South bridge 103. The North bridge 102 provides access to system memory 115 and a graphics processor unit (GPU) 110. The South bridge 103 provides access to a plurality of coupled peripheral devices 131–135 as shown. Data communication is provided by the system memory bus 122, the graphics bus 121, and the expansion bus 123 (e.g., which can include PCI buses, USB buses, IEEE 1394 buses, or the like). The GPU 110 is coupled to a dedicated graphics memory 111 and is coupled to provide video information to a display 112. Computer system 100 also shows a BIOS ROM 140 that stores BIOS initialization software.

EMBODIMENTS OF THE PRESENT INVENTION

Figure 2:
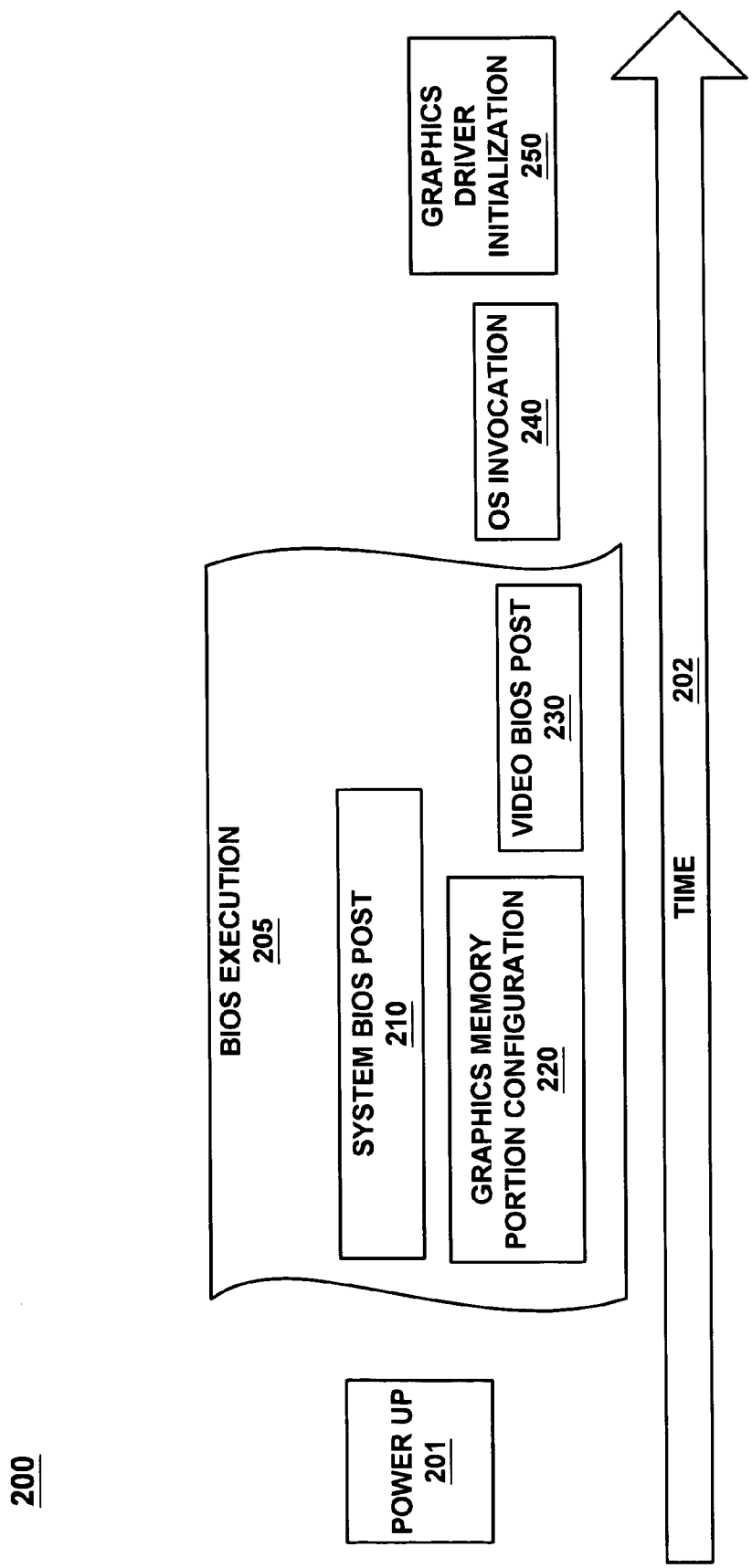
FIG. 2 shows a diagram of a BIOS execution sequence in accordance with one embodiment of the present invention.

FIG. 2 shows a diagram of a BIOS execution sequence in accordance with one embodiment of the present invention. As depicted in FIG. 2, BIOS execution events are shown as they occur in time, with the earliest events on the left side of FIG. 2 and the later events on the right side of FIG. 2. Time is shown progressing from left to right by the axis 202. Thus, the earliest event is the initial power up 201 of the computer system 100. After the initial power up 201, BIOS execution 205 begins. The BIOS execution 205 comprises a system BIOS power on self test (POST) 210, a graphics memory portion configuration 220, and a video BIOS POST 230. In this embodiment, the system BIOS POST 210 and the graphics memory portion configuration 220 are shown occurring at approximately the same time during the BIOS execution sequence, and the video BIOS POST 230 is shown completing shortly thereafter. After the BIOS execution 205, the operating system invocation 240 is shown, followed by the graphics driver initialization 250.

Referring still to FIG. 2, embodiments of the present invention function in part by utilizing graphics memory 111 to provide storage for video BIOS initialization routines which execute out of BIOS ROM 140. In the present embodiment, the BIOS ROM 140 provides the Video BIOS memory (e.g., the nonvolatile memory storing the video BIOS software) that is accessed by the CPU 101 to execute video BIOS initialization routines. A portion of graphics memory 111 (e.g., graphics RAM) is configured for access by the video BIOS initialization routines. Program execution data (e.g., stack storage, variables, and the like) from the video BIOS initialization routines is then stored in the portion of graphics memory 111. In the present embodiment, as shown by the diagram 200, the graphics memory portion is configured to store the program execution data prior to a completion of a video BIOS POST 230.

Video BIOS initialization routines in accordance with embodiments of the present invention require more storage than what is currently defined in the legacy PC architecture. The video BIOS initialization routines in accordance with embodiments of the present invention are configured to provide a greatly enhanced degree of functionality comparing to prior art. Such functionality is enabled by the memory execution space of the graphics memory 111. As known by those skilled in the art, the graphics memory 111 is not normally available to the BIOS execution routines 205 prior to the initialization of the graphics driver 250. Embodiments of the present invention provide a mechanism for accessing the graphics memory 111 prior to the initialization of the graphics driver 250.

The graphics memory 111 is used to provide storage for program execution data. Examples of program execution data include stack storage data (e.g., the "stack") accessed by the BIOS executing out of the BIOS ROM 140. As used herein, program execution data does not include the storing of information into memory for a mere purpose of testing the memory (e.g., test bits etc.).

The particular portion of the graphics memory 111 used for video BIOS execution can be configured as a contiguous addressable region, providing a high degree of flexibility in its use by the video BIOS execution software routines.

In the present embodiment, the graphics memory 111 is configured to reduce the risk of hardware interrupts corrupting program execution data. This is due to the fact that the legacy PC architecture does not expect the graphics memory 111 to be available. Additionally, the legacy PC architecture does not directly access the graphics memory 111 without first accessing the graphics driver. Because of this, hardware interrupts which may occur during the BIOS execution sequence 205 cannot corrupt the graphics memory 111 in the same manner that they might corrupt the system memory 115.

Embodiments of the present invention can be configured to retain program execution data stored in the graphics memory 111 and make such program execution data available after the initialization of the operating system (e.g., operating system invocation 240) and the graphics driver (e.g., graphics driver initialization 250). For example, a graphics driver in accordance with one embodiment of the present invention can be configured to access the portion of the graphics memory 111 storing the program execution data and manage the portion as required. In this manner, the program execution data stored in the graphics memory can remain available after the initialization of the graphics card driver, and any information stored therein can be used in accordance with requirements of the user or a user application.

Figure 3:
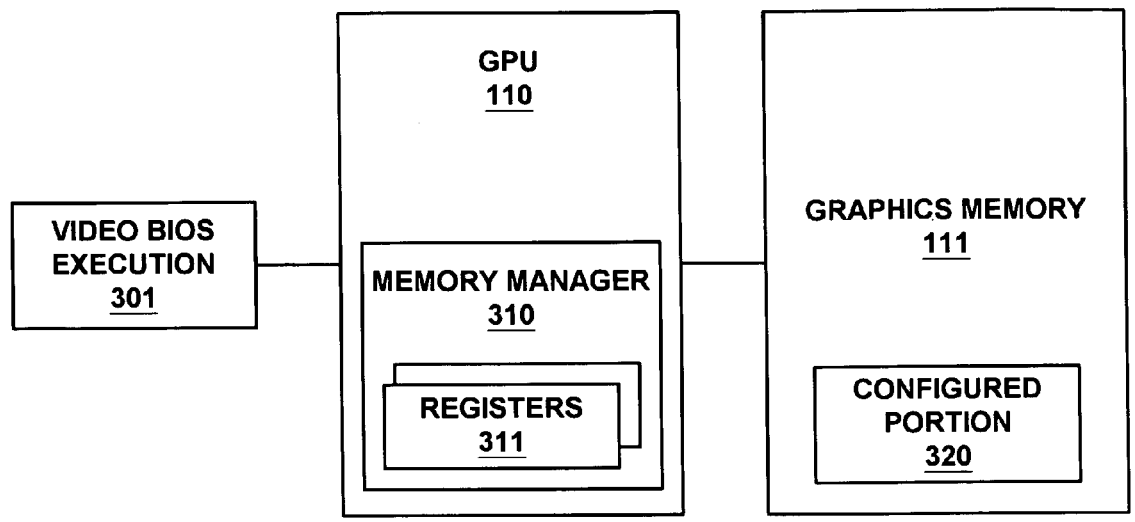
FIG. 3 shows a diagram depicting the access of the video BIOS execution to a plurality of registers of a memory manager within the GPU in accordance with one embodiment of the present invention.

FIG. 3 shows a diagram 300 depicting the access of the video BIOS execution 301 to a plurality of registers 311 of a memory manager 310 within the GPU 111. Diagram 300 shows one mechanism by which the video BIOS execution 301 is provided with access to a configured portion 320 of the graphics memory 111.

In the present embodiment, access to the configured portion 320 is managed by the memory manager 310 of the GPU 110. The video BIOS execution 301, as it executes on the CPU 101, places write data into the registers 311. This data is subsequently loaded into the configured portion 320 by the memory manager 310. Read data is acquired by the memory manager 310 and placed into the registers 311 where it is subsequently accessed and read by the video BIOS execution 301. Accordingly, the registers 311 function as "ports" for writing data into and reading data out of the configured portion 320. Thus, the GPU 110 provides the memory manager hardware 310 required to manage the program execution data stored in the graphics memory 111. This is the same memory management hardware that is used by the graphics driver in manipulating and accessing the graphics memory 111 during is normal operation.

Figure 4:
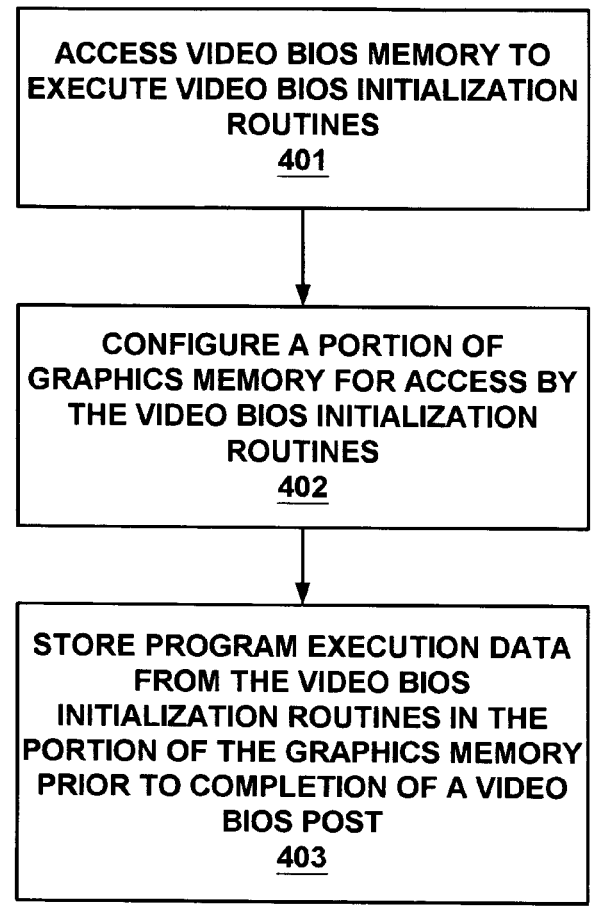
FIG. 4 shows a flowchart of the steps of the process in accordance with one embodiment of the present invention.

FIG. 4 shows a flowchart of the steps of the process 400 in accordance with one embodiment of the present invention. As depicted in FIG. 4, process 400 shows the steps involved in configuring a portion of graphics memory to support video BIOS execution.

Process 400 begins in step 401 where video BIOS memory is accessed to begin execution of the video BIOS initialization routines. In step 402, a portion 320 of the graphics memory 111 is configured for access by the video BIOS initialization routines (e.g., video BIOS execution 301). As described above, the video BIOS initialization routines are configured to interact with the memory manager 310 of the GPU 110 in order to gain access to a portion 320 of the graphics memory 111. This includes accessing the ports, or the registers 311, of the memory manager 310. In step 403, program execution data from the video BIOS initialization routines 301 are stored in the configured portion 320 of the graphics memory 111. As described above, this program execution data is stored prior to completion of the video BIOS POST 230.

Figure 5:
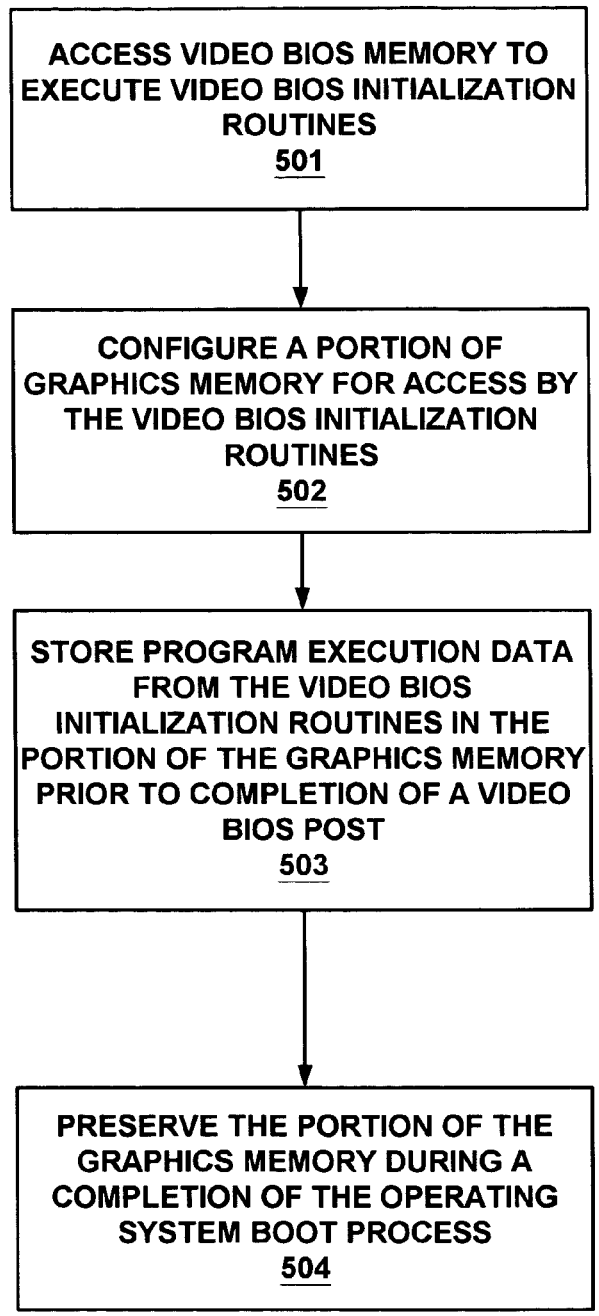
FIG. 5 shows a flowchart of the steps of a process in accordance with one embodiment of the present invention, wherein the program execution data stored in the configured portion of the graphics memory is retained after the operating system initialization and after the graphics driver initialization.

FIG. 5 shows a flowchart of the steps of a process 500 in accordance with one embodiment of the present invention, wherein the program execution data stored in the configured portion of the graphics memory is retained after the operating system initialization and after the graphics driver initialization.

Process 500 begins in the same manner as process 400 of FIG. 4. Process 500 begins in step 501 where video BIOS memory is accessed to begin execution of the video BIOS initialization routines. In step 502, a portion 320 of the graphics memory 111 is configured for access by the video BIOS initialization routines. In step 503, program execution data from the video BIOS initialization routines 301 are stored in the configured portion 320 of the graphics memory 111. Subsequently, in step 504, the portion 320 of the graphics memory 311 storing the program execution data is preserved during a completion of the operating system invocation 240 and a completion of the boot process such that the program execution data is available subsequent to the boot process. In addition, in step 505, the portion 320 of the graphics memory 311 storing the program execution data is preserved for access by the graphics driver using graphics driver routines. The integrity of the data stored in the portion 320 is maintained during the graphics driver initialization 250.

Figure 6:
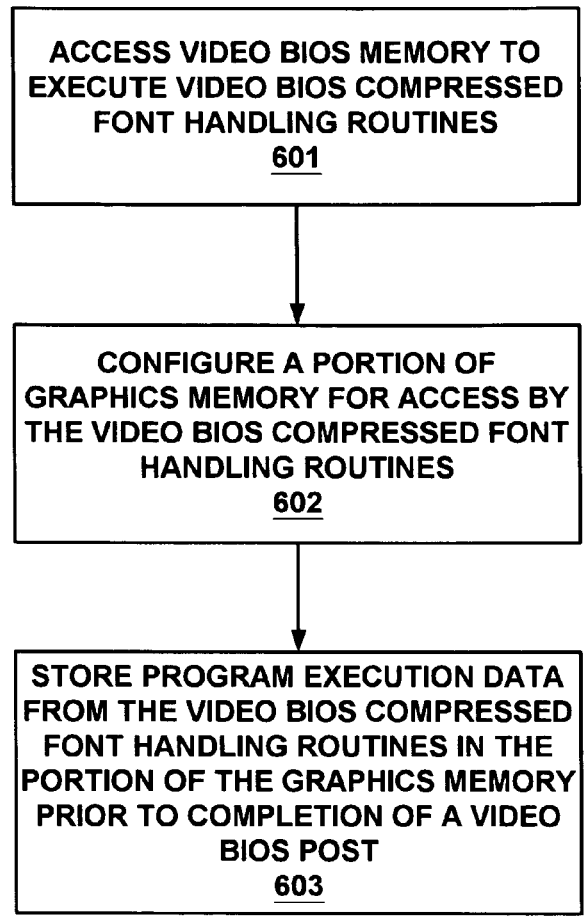
FIG. 6 shows a flowchart of the steps of a process in accordance with one embodiment of the present invention, wherein the program execution data stored in the configured portion of the graphics memory is used to provide compressed font support.

FIG. 6 shows a flowchart of the steps of a process 600 in accordance with one embodiment of the present invention, wherein the program execution data stored in the configured portion of the graphics memory is used to provide compressed font support.

Process 600 begins in step 601 where video BIOS memory is accessed to begin execution of the video BIOS initialization routines, including compressed font handling routines. In step 602, a portion of the graphics memory is configured for access by the video BIOS compressed font handling routines. In accordance with the present embodiment, compressed font handling routines are software routines designed to decompress data required to show different fonts on the display. Data for displaying the fonts is compressed in order to reduce the amount of space required for the storage. However, a larger amount of program execution space is required in order to handle the decompression routines. This program execution space is provided by the configured portion 320 of the graphics memory 311 in the manner described above. Subsequently, in step 603, program execution data from the video BIOS compressed font handling routines is stored in the configured portion 320 of the graphics memory 111.

Figure 7:
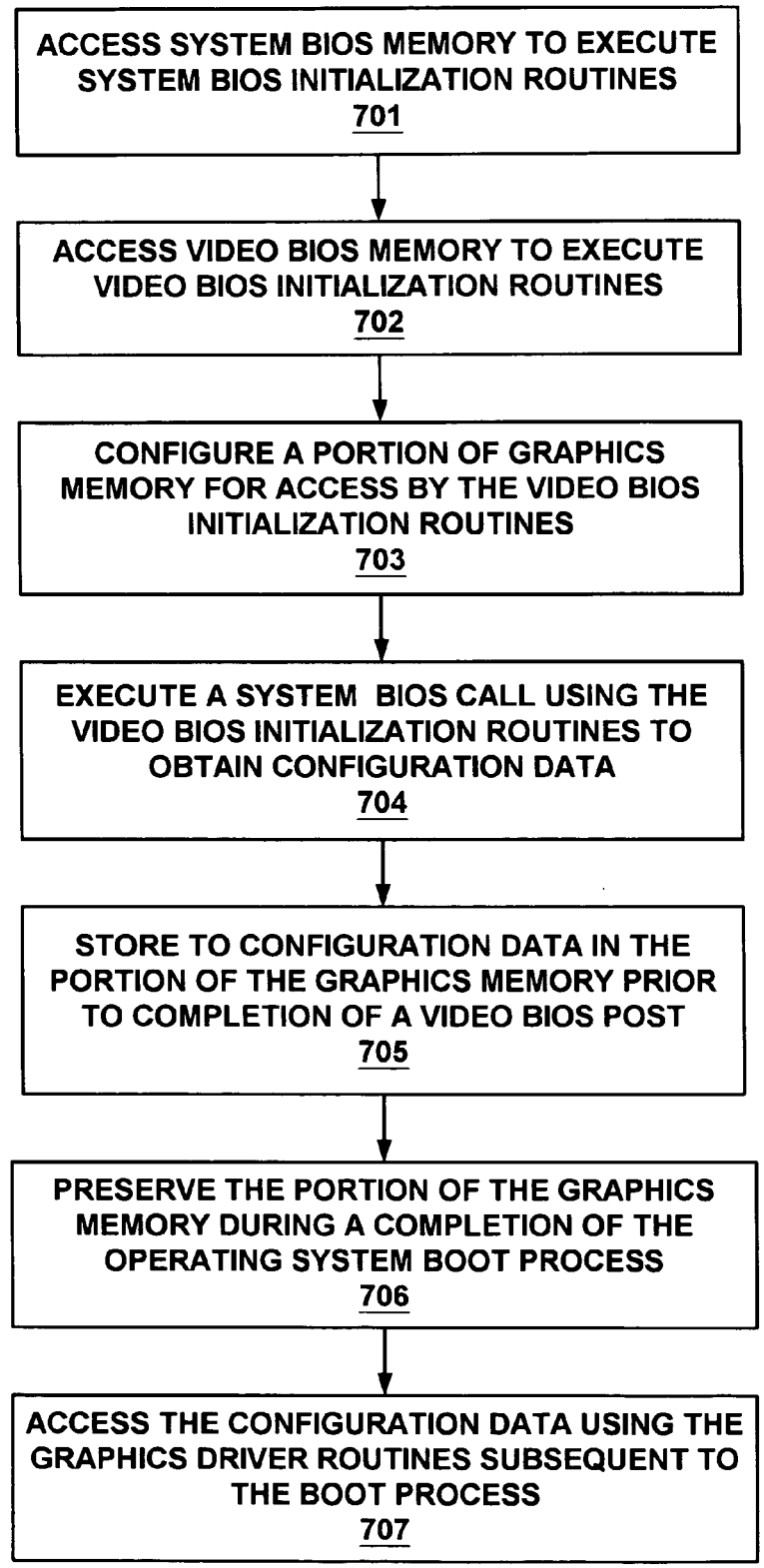
FIG. 7 shows a flowchart of the steps of a process in accordance with one embodiment of the present invention, wherein the program execution data stored in the configured portion of the graphics memory is used to preserve configuration data obtained from the system BIOS initialization POST.

FIG. 7 shows a flowchart of the steps of a process 700 in accordance with one embodiment of the present invention, wherein the program execution data stored in the configured portion of the graphics memory is used to preserve configuration data obtained from the system BIOS initialization POST.

Process 700 begins in step 701, where system BIOS memory is accessed to begin execution of the system BIOS initialization routines (e.g., system BIOS POST 210). In step 702, video BIOS memory is accessed to begin execution of the video BIOS initialization routines. In step 703, the portion 320 of the graphics memory 111 is configured for access by the video BIOS initialization routines.

In step 704, a system BIOS call is executed using the video BIOS initialization routines in order to obtain system BIOS configuration data. The system BIOS configuration data can include, for example, data identifying specific hardware of the computer system 100, specific firmware versions of the computer system 100, display specific data (e.g., maximum resolution, maximum pixel frequency, display size, manufacturer, model, etc.), or the like. In step 705, the configuration data is stored in the portion of the graphics memory 320. In step 706, the portion 320 of the graphics memory 311 is preserved during a completion of the computer system boot process. In step 707, the portion 320 of the graphics memory 311 is accessed using graphics driver routines subsequent to the boot process. In this manner, information can be obtained from the system BIOS that would otherwise not be available after the initialization of the operating system, or would otherwise be prevented by the operating system.

As a specific example, the system BIOS configuration data can include EDID (Extended Display Identification Data standard, as published by the Video Electronics Standards Association, in various releases and revisions, including Enhanced EDID). Normally, EDID is read by a computer from an external display device that stores its EDID. However, in some circumstances, such as laptop computers, the display device is not external, and it would be advantageous to obtain the EDID from the system BIOS. Hence, in laptops, the video BIOS can call the system BIOS to obtain the EDID (or the equivalent), and the video BIOS can store the EDID in graphics memory and preserve the stored data beyond boot completion, where it can be read by the video driver.

Thus, embodiments of the present invention provide a method and system for utilizing graphics memory to provide storage for video BIOS initialization. Embodiments of the present invention overcome the memory limitations that constrain the functionality of the BIOS software. Embodiments of the present invention eliminate the memory limitations of the video BIOS execution but are still compatible with the legacy PC architecture.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for utilizing graphics memory to provide storage for video BIOS initialization, comprising:
   accessing video BIOS memory to execute video BIOS initialization routines;
   configuring a portion of graphics memory for access by the video BIOS initialization routines; and
   storing program execution data from the video BIOS initialization routines in the portion of graphics memory, wherein the program execution data is stored prior to a completion of a video BIOS power on self test.

2. The method of claim 1 further comprising:
   accessing a GPU (graphics processor unit) to configure the portion of the graphics memory.

3. The method of claim 1 further comprising:
   accessing at least one port of a GPU (graphics processor unit) to store the program execution data from the video BIOS initialization routines in the portion of the graphics memory.

4. The method of claim 1 wherein the program execution data comprises a stack for the video BIOS initialization routines.

5. The method of claim 1 wherein the portion of the graphics memory is configured as a contiguous addressable region.

6. The method of claim 1 wherein the portion of the graphics memory is configured to be free from hardware interrupt corrupting.

7. A computer readable media having computer readable code which when executed by a computer system causes the computer system to implement a method for utilizing graphics memory to provide storage for video BIOS initialization, comprising:
   accessing video BIOS memory to execute video BIOS initialization routines;
   configuring a portion of graphics memory for access by the video BIOS initialization routines; and
   storing program execution data from the video BIOS initialization routines in the portion of graphics memory, wherein the program execution data is stored prior to a completion of a video BIOS power on self test.

8. The computer readable media of claim 7 further comprising:
   accessing a GPU (graphics processor unit) to configure the portion of the graphics memory.

9. The computer readable media of claim 7 further comprising:
   accessing at least one port of a GPU (graphics processor unit) to store the program execution data from the video BIOS initialization routines in the portion of the graphics memory.

10. The computer readable media of claim 7 wherein the program execution data comprises a stack for the video BIOS initialization routines.

11. The computer readable media of claim 7 wherein the portion of the graphics memory is configured as a contiguous addressable region.

12. The computer readable media of claim 7 wherein the portion of the graphics memory is configured to be free from hardware interrupt corrupting.

13. A method for utilizing graphics memory to provide storage for video BIOS initialization and preserving the storage through operating system boot, comprising:
   accessing video BIOS memory to execute video BIOS initialization routines;
   configuring a portion of graphics memory for access by the video BIOS initialization routines;
   storing program execution data from the video BIOS initialization routines in the portion of graphics memory, wherein the program execution data is stored prior to a completion of a video BIOS power on self test; and
   preserving at least part of the portion of the graphics memory storing program execution data during a completion of an operating system boot process such that at least part of the program execution data is available subsequent to the boot process.

14. The method of claim 13 further comprising:
   accessing a GPU (graphics processor unit) to configure the portion of the graphics memory.

15. The method of claim 13 further comprising:
   accessing at least one port of a GPU (graphics processor unit) to store the program execution data from the video BIOS initialization routines in the portion of the graphics memory.

16. The method of claim 13 wherein the program execution data comprises a stack for the video BIOS initialization routines.

17. The method of claim 13 wherein the portion of the graphics memory is configured as a contiguous addressable region.

18. The method of claim 13 wherein the portion of the graphics memory is configured to be free from hardware interrupt corrupting.

19. A computer readable media having computer readable code which when executed by a computer system causes the computer system to implement a method for utilizing graphics memory to provide storage for video BIOS initialization and preserving the storage through operating system boot, comprising:
   accessing video BIOS memory to execute video BIOS initialization routines;
   configuring a portion of graphics memory for access by the video BIOS initialization routines;
   storing program execution data from the video BIOS initialization routines in the portion of graphics memory, wherein the program execution data is stored prior to a completion of a video BIOS power on self test; and preserving at least part of the portion of the graphics memory storing program execution data during a completion of an operating system boot process such that at least part of the program execution data is available subsequent to the boot process.

20. The computer readable media of claim 19 further comprising:
   accessing a GPU (graphics processor unit) to configure the portion of the graphics memory.

21. The computer readable media of claim 19 further comprising:
   accessing at least one port of a GPU (graphics processor unit) to store the program execution data from the video BIOS initialization routines in the portion of the graphics memory.

22. The computer readable media of claim 19 wherein the program execution data comprises a stack for the video BIOS initialization routines.

23. The computer readable media of claim 19 wherein the portion of the graphics memory is configured as a contiguous addressable region.

24. The computer readable media of claim 19 wherein the portion of the graphics memory is configured to be free from hardware interrupt corrupting.

25. A method for utilizing graphics memory to provide storage for video BIOS initialization and maintaining the storage for use by a graphics driver, comprising:
  accessing video BIOS memory to execute video BIOS initialization routines;
  configuring a portion of graphics memory for access by the video BIOS initialization routines;
  storing program execution data from the video BIOS initialization routines in the portion of graphics memory, wherein the program execution data is stored prior to a completion of a video BIOS power on self test;
  preserving at least part of the portion of the graphics memory storing program execution data during a completion of a computer system boot process; and
  accessing the part of the portion of the graphics memory storing the program execution data using graphics driver routines subsequent to the boot process.

26. The method of claim 25 further comprising:
  accessing a GPU (graphics processor unit) to configure the portion of the graphics memory.

27. The method of claim 25 further comprising:
  accessing at least one port of a GPU (graphics processor unit) to store the program execution data from the video BIOS initialization routines in the portion of the graphics memory.

28. The method of claim 25 wherein the program execution data comprises a stack for the video BIOS initialization routines.

29. The method of claim 25 wherein the portion of the graphics memory is configured as a contiguous addressable region.

30. The method of claim 25 wherein the portion of the graphics memory is configured to be free from hardware interrupt corrupting.

31. A computer readable media having computer readable code which when executed by a computer system causes the computer system to implement a method for utilizing graphics memory to provide storage for video BIOS initialization and maintaining the storage for use by a graphics driver, comprising:
  accessing video BIOS memory to execute video BIOS initialization routines;
  configuring a portion of graphics memory for access by the video BIOS initialization routines;
  storing program execution data from the video BIOS initialization routines in the portion of graphics memory, wherein the program execution data is stored prior to a completion of a video BIOS power on self test;
  preserving at least part of the portion of the graphics memory storing program execution data during a completion of a computer system boot process; and
  accessing the part of the portion of the graphics memory storing the program execution data using graphics driver routines subsequent to the boot process.

32. The computer readable media of claim 31 further comprising:
  accessing a GPU (graphics processor unit) to configure the portion of the graphics memory.

33. The computer readable media of claim 31 further comprising:
  accessing at least one port of a GPU (graphics processor unit) to store the program execution data from the video BIOS initialization routines in the portion of the graphics memory.

34. The computer readable media of claim 31 wherein the program execution data comprises a stack for the video BIOS initialization routines.

35. The computer readable media of claim 31 wherein the portion of the graphics memory is configured as a contiguous addressable region.

36. The computer readable media of claim 31 wherein the portion of the graphics memory is configured to be free from hardware interrupt corrupting.

37. A method for utilizing graphics memory to provide storage for video BIOS compressed font handling routines, comprising:
  accessing video BIOS memory to execute video BIOS compressed font handling routines;
  configuring a portion of graphics memory for access by the video BIOS compressed font handling routines; and
  storing program execution data from the video BIOS compressed font handling routines in the portion of graphics memory, wherein the program execution data is stored prior to a completion of a video BIOS power on self test.

38. The method of claim 37 further comprising:
  accessing a GPU (graphics processor unit) to configure the portion of the graphics memory.

39. The method of claim 37 further comprising:
  accessing at least one port of a GPU (graphics processor unit) to store the program execution data from the video BIOS initialization routines in the portion of the graphics memory.

40. The method of claim 37 wherein the program execution data comprises a stack for the video BIOS compressed font handling routines.

41. The method of claim 37 wherein the portion of the graphics memory is configured as a contiguous addressable region.

42. The method of claim 37 wherein the portion of the graphics memory is configured to be free from hardware interrupt corrupting.

43. A computer readable media having computer readable code which when executed by a computer system causes the computer system to implement a method for utilizing graphics memory to provide storage for video BIOS compressed font handling routines, comprising:
  accessing video BIOS memory to execute video BIOS compressed font handling routines;
  configuring a portion of graphics memory for access by the video BIOS compressed font handling routines; and
  storing program execution data from the video BIOS compressed font handling routines in the portion of graphics memory, wherein the program execution data is stored prior to a completion of a video BIOS power on self test.

44. The computer readable media of claim 43 further comprising:
  accessing a GPU (graphics processor unit) to configure the portion of the graphics memory.

45. The computer readable media of claim 43 further comprising:
  accessing at least one port of a GPU (graphics processor unit) to store the program execution data from the video BIOS initialization routines in the portion of the graphics memory.

46. The computer readable media of claim 43 wherein the program execution data comprises a stack for the video BIOS compressed font handling routines.

47. The computer readable media of claim 43 wherein the portion of the graphics memory is configured as a contiguous addressable region.

48. The computer readable media of claim 43 wherein the portion of the graphics memory is configured to be free from hardware interrupt corrupting.

49. A method for utilizing graphics memory to provide storage for configuration data, comprising:
- accessing system BIOS memory after a computer system power on to execute system BIOS initialization routines;
- accessing video BIOS memory to execute video BIOS initialization routines;
- configuring a portion of graphics memory for access by the video BIOS initialization routines;
- executing a system BIOS call using the video BIOS initialization routines to obtain the configuration data;
- storing the configuration data in the portion of the graphics memory;
- preserving at least part of the portion of the graphics memory storing the configuration data during a completion of a computer system boot process; and
- accessing the portion of the graphics memory storing the configuration data using graphics driver routines subsequent to the boot process.

50. The method of claim 49 wherein the configuration data comprises data describing a display device.

51. The method of claim 49 wherein the configuration data comprises Extended Display Identification Data (EDID).

52. The method of claim 49 further comprising:
- accessing a GPU (graphics processor unit) to configure the portion of the graphics memory.

53. The method of claim 49 further comprising:
- accessing at least one port of a GPU (graphics processor unit) to store the configuration data in the portion of the graphics memory.

54. The method of claim 49 wherein the portion of the graphics memory is configured as a contiguous addressable region.

55. The method of claim 49 wherein the portion of the graphics memory is configured to be free from hardware interrupt corrupting.

56. A computer readable media having computer readable code which when executed by a computer system causes the computer system to implement a method for utilizing graphics memory to provide storage for configuration data, comprising:
- accessing system BIOS memory after a computer system power on to execute system BIOS initialization routines;
- accessing video BIOS memory to execute video BIOS initialization routines;
- configuring a portion of graphics memory for access by the video BIOS initialization routines;
- executing a system BIOS call using the video BIOS initialization routines to obtain the configuration data;
- storing the configuration data in the portion of the graphics memory;
- preserving at least part of the portion of the graphics memory storing the configuration data during a completion of a computer system boot process; and
- accessing the portion of the graphics memory storing the configuration data using graphics driver routines subsequent to the boot process.

57. The computer readable media of claim 56 wherein the configuration data comprises data describing a display device.

58. The computer readable media of claim 56 wherein the configuration data comprises Extended Display Identification Data (EDID).

59. The computer readable media of claim 56 further comprising:
- accessing a GPU (graphics processor unit) to configure the portion of the graphics memory.

60. The computer readable media of claim 56 further comprising:
- accessing at least one port of a GPU (graphics processor unit) to store the configuration data in the portion of the graphics memory.

61. The computer readable media of claim 56 wherein the portion of the graphics memory is configured as a contiguous addressable region.

62. The computer readable media of claim 56 wherein the portion of the graphics memory is configured to be free from hardware interrupt corrupting.

63. A computer system comprising:
- a central processing unit (CPU);
- random-access memory for storing programs executable by the CPU; and
- computer readable media having computer readable code which when executed by the CPU implements a method for utilizing graphics memory to provide storage for video BIOS initialization, comprising:
  - accessing video BIOS memory to execute video BIOS initialization routines;
  - configuring a portion of graphics memory for access by the video BIOS initialization routines; and
  - storing program execution data from the video BIOS initialization routines in the portion of graphics memory, wherein the program execution data is stored prior to a completion of a video BIOS power on self test.

64. The computer system of claim 63, wherein the method further comprises:
- preserving at least part of the portion of the graphics memory storing program execution data during a completion of an operating system boot process such that at least part of the program execution data is available subsequent to the boot process.

65. The computer system of claim 64, wherein the method further comprises:
- accessing the part of the portion of the graphics memory storing the program execution data using graphics driver routines subsequent to the boot process.

66. The computer system of claim 65, wherein the program execution data comprises character font data.

67. The computer system of claim 65, wherein the method further comprises:
- executing a system BIOS call using the video BIOS initialization routines to obtain configuration data.

68. The method of claim 67 wherein the configuration data comprises data describing a display device.

69. The method of claim 67 wherein the configuration data comprises Extended Display Identification Data (EDID).

* * * * *